(No Model.)
J. R. YOUNG.
SPRING TOOTH ATTACHMENT FOR CULTIVATORS.
No. 390,276. Patented Oct. 2, 1888.
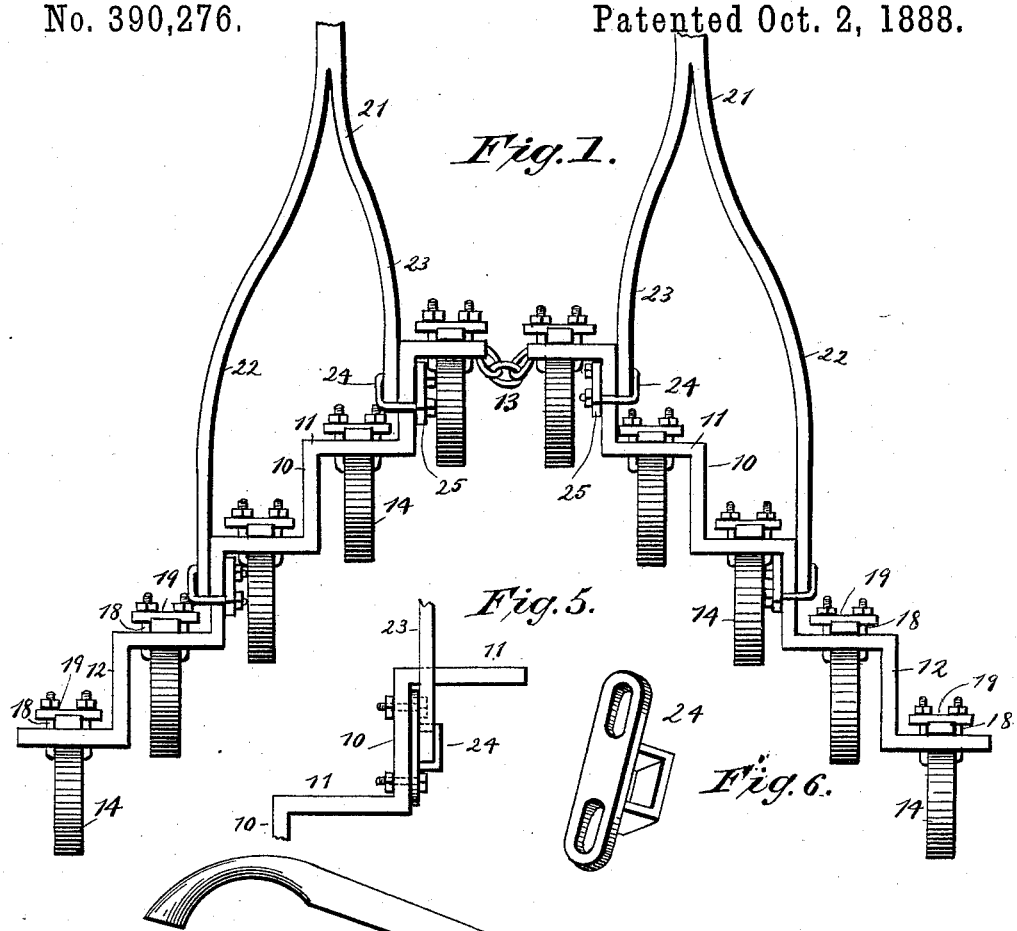
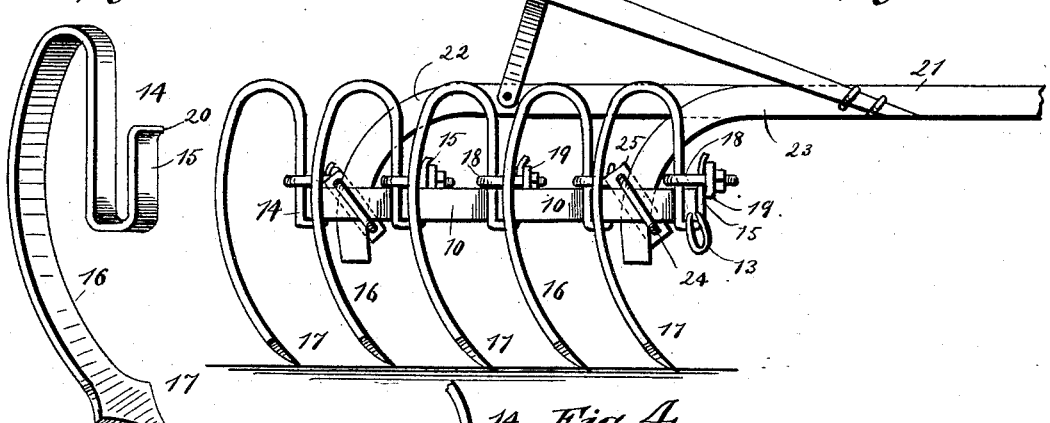
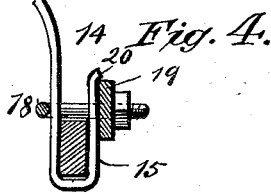

UNITED STATES PATENT OFFICE.

JOHN R. YOUNG, OF OSCEOLA, MISSOURI, ASSIGNOR TO HIMSELF, MICHAEL S. WHEELER, AND JOSEPH S. LINNEY, OF SAME PLACE.

SPRING-TOOTH ATTACHMENT FOR CULTIVATORS.

SPECIFICATION forming part of Letters Patent No. 390,276, dated October 2, 1888.

Application filed April 25, 1888. Serial No. 271,784. (No model.)

*To all whom it may concern:*

Be it known that I, JOHN R. YOUNG, of Osceola, in the county of St. Clair and State of Missouri, have invented a new and Improved Spring-Tooth Attachment for Cultivators, of which the following is a full, clear, and exact description.

My invention relates to a spring-tooth attachment for cultivators, and has for its object to provide a simple, conveniently-attached and durable device which may be effectively employed in connection with any cultivator.

The invention consists in the construction and combination of the several parts, as will be hereinafter fully set forth, and pointed out in the claims.

Reference is to be had to the accompanying drawings, forming a part of this specification, in which similar figures of reference indicate corresponding parts in all the views.

Figure 1 is a plan view of the attachment. Fig. 2 is a side elevation of the same. Fig. 3 is a detail perspective view of the tooth. Fig. 4 is a detail sectional view illustrating the mode of attaching the teeth to the frame; and Figs. 5 and 6 illustrate a modification of the device employed to attach the handle to the implement.

In carrying out the invention two zigzag bars, 10, are provided, bent at right angles to form a series of offset members, 11, and connecting members 12, the approaching end offsets of the said bars being united by links 13, or in any other manner, whereby each bar will be substantially independent in action of the other and constitute a frame.

Upon the inner side of the frame teeth 14 are secured, one of which teeth is attached to each offset 11. The teeth 14 consist of an essentially U-shaped socket, 15, and a downwardly and forwardly curved blade, 16, terminating preferably in a flattened and pointed shovel-like cutting-surface, 17, as best shown in Fig. 3.

In attaching the several teeth the offsets of the frame are embraced by the sockets 15, and the said sockets are held in connection with the said offsets by means of clips 18, embracing the former above the frame, the extremities of which clips are threaded, and passing through a strap-plate, 19, are provided with suitable nuts, as shown in Fig. 1. A lip, 20, is provided upon the socket, under and in contact with which the strap-plate is located, whereby the latter is prevented from slipping upward.

The several bars constituting the frame are attached to the cultivator at the rear, at any suitable point and in any approved manner, through the medium of a horizontally-arranged beam or beams, 21, the said beam or beams being bifurcated at the inner end, whereby the arms 22 and 23 are obtained. The arm 22 is longer than the arm 23, and both the arms at their extremities are curved downward to an engagement with the outer face of the connecting members of the tooth-bar 10, as best shown in Fig. 1.

In attaching the bars to the beams 21 the members of the former are preferably attached to the arm 23, near the forward ends of the bars, and the arm 22 approximating the outer ends. These arms may be secured to the connecting members of the bars through the medium of clips 24, as shown in Fig. 1, provided with a strap-plate, 25, and nuts retaining the strap-plate in position; or they may be adjustably attached, as illustrated in Figs. 5 and 6, in which a plate is employed provided with apertures at each end, and a yoke cast integral with the center at the back.

In attaching this locking device the straight face of the plate is placed in engagement with the inner face of the bar, as shown in Fig. 5, the apertures in the plate registering with similar apertures in the bar. The bar and plate are then held in contact by suitable bolts passed through said apertures. The curved ends of the several arms 22 and 23 of the beam 21 are inserted in the yoke and riveted or otherwise secured thereto.

The implement may be attached to any kind of cultivator or double-shovel plow. It gives an even culture, leaving the ground smooth and level, thereby killing all small vegetation, such as weeds, &c.

The implement may be used in connection with the cultivation of corn, cotton, and other similar plants by disconnecting the links and permitting the crop to pass between the sections.

Having thus described my invention, what I claim as new, and desire to secure by Letters Patent, is—

1. A cultivator-tooth, 14, provided at its upward forward end with a U-shaped socket, 15, open at its upper end, the tooth extending upward from the inner arm of the socket and curved rearwardly and downwardly therefrom, substantially as set forth.

2. A cultivator-tooth, 14, having a U-shape socket, 15, open at the upper end, and provided with an outwardly-projecting lip, 20, at the upper end of the forward member, the tooth proper extending upwardly from the inner socket-arm, thence rearwardly and downwardly in a forward direction, and terminating in a shovel-point, substantially as set forth.

3. The combination, with the zigzag cultivator-frame, of the forwardly-curved teeth having vertical sockets open at their upper ends and receiving the horizontal offsets of said frame, substantially as set forth.

4. The combination, with the cultivator-frame formed in two flexibly-connected zigzag sections, of the forwardly-curved cultivator-teeth 14, having vertical U-shaped sockets 15 at their upper forward ends receiving the horizontal offsets of the frame, and clips embracing the sockets above the said frame, substantially as set forth.

5. The combination, with the harrow-frame formed of zigzag sections placed edgewise and flexibly connected at their forward ends, and the beams having bifurcated ends secured to the longitudinal offsets of the frame, of the downwardly and forwardly curved teeth 14, having vertical U shaped sockets 15 at their upper forward ends receiving the horizontal offsets of the frame, and provided at the upper ends of their forward arms with lips, so the clips 18 embrace the sockets above the frame, and the plates 19, secured on the forward ends of the clips under said lips, substantially as set forth.

JOHN R. YOUNG.

Witnesses:
JOSEPH J. NEWELL,
JAS. H. LINNEY.